United States Patent
Allen et al.

(10) Patent No.: US 9,626,622 B2
(45) Date of Patent: Apr. 18, 2017

(54) TRAINING A QUESTION/ANSWER SYSTEM USING ANSWER KEYS BASED ON FORUM CONTENT

(71) Applicant: International Business Machines Corporation, Armonk, NY (US)

(72) Inventors: Corville O. Allen, Morrisville, NC (US); Andrew R. Freed, Cary, NC (US); Stephan J. Roorda, Fuquay-Varina, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/570,305

(22) Filed: Dec. 15, 2014

(65) Prior Publication Data

US 2016/0171373 A1  Jun. 16, 2016

(51) Int. Cl.
G06N 5/02  (2006.01)
G06F 17/27  (2006.01)
G06F 17/30  (2006.01)
G06N 5/00  (2006.01)

(52) U.S. Cl.
CPC .......... *G06N 5/022* (2013.01); *G06F 17/277* (2013.01); *G06F 17/2765* (2013.01); *G06F 17/3043* (2013.01); *G06F 17/30997* (2013.01); *G06N 5/00* (2013.01)

(58) Field of Classification Search
None
See application file for complete search history.

(56) References Cited

U.S. PATENT DOCUMENTS

| | | |
|---|---|---|
| 7,640,164 B2 | 12/2009 | Sasaki et al. |
| 8,185,448 B1 | 5/2012 | Myslinski |
| 8,224,816 B2 | 7/2012 | O'Malley |
| 8,275,306 B2 | 9/2012 | Attali |
| 8,346,701 B2 | 1/2013 | Wang et al. |
| 8,447,607 B2 | 5/2013 | Weider et al. |

(Continued)

FOREIGN PATENT DOCUMENTS

| | | |
|---|---|---|
| JP | 2012-93972 | 5/2012 |
| WO | 2007038292 | 4/2007 |
| WO | 2009052277 | 4/2009 |

OTHER PUBLICATIONS

Hao12, Finding similar questions in collaborative question answering archives: toward bootstrapping-based equivalent pattern learning [online], Feb. 24, 2012 [retrieved on Jan. 25, 2016]. Retrieved from the Internet<URL:http://link.springer.com/content/pdf/10.1007%2Fs10791-012-9188-x.pdf>.*

(Continued)

*Primary Examiner* — Stanley K Hill
*Assistant Examiner* — Nathan Brown, Jr.
(74) *Attorney, Agent, or Firm* — VanLeeuwen & VanLeeuwen; Diana R. Gerhardt

(57) ABSTRACT

An approach is provided to train a question answering (QA) system using answer keys based on forum content. In the approach, a question is selected from a post in a threaded discussion. An answer to the selected question is automatically identified from crowd-based sources, with the identified answer having a confidence level greater than a threshold. An answer key is built using the selected question and the identified answer. The QA system is automatically trained using the answer key.

20 Claims, 15 Drawing Sheets

(56) References Cited

U.S. PATENT DOCUMENTS

| | | | |
|---|---|---|---|
| 8,473,499 | B2 | 6/2013 | Song et al. |
| 8,543,565 | B2 | 9/2013 | Feng |
| 8,560,567 | B2 | 10/2013 | Azzam et al. |
| 9,299,114 | B2 | 3/2016 | Hind et al. |
| 2004/0254917 | A1 | 12/2004 | Brill et al. |
| 2006/0078862 | A1 | 4/2006 | Goto et al. |
| 2008/0096533 | A1 | 4/2008 | Manfredi et al. |
| 2008/0205774 | A1 | 8/2008 | Brinker et al. |
| 2009/0150388 | A1 | 6/2009 | Roseman et al. |
| 2009/0162824 | A1 | 6/2009 | Heck |
| 2010/0119053 | A1 | 5/2010 | Goeldi |
| 2011/0040759 | A1 | 2/2011 | Rappoport et al. |
| 2011/0119047 | A1 | 5/2011 | Ylonen |
| 2011/0295593 | A1 | 12/2011 | Raghuveer |
| 2011/0295594 | A1 | 12/2011 | Cai et al. |
| 2011/0301941 | A1 | 12/2011 | De Vocht |
| 2012/0072217 | A1 | 3/2012 | Bangalore et al. |
| 2012/0078613 | A1 | 3/2012 | Kandekar et al. |
| 2012/0116982 | A1 | 5/2012 | Yoshida et al. |
| 2012/0221638 | A1 | 8/2012 | Edamadaka et al. |
| 2013/0013706 | A1 | 1/2013 | Gupta et al. |
| 2013/0224713 | A1 | 8/2013 | Ajmera et al. |
| 2013/0238601 | A1 | 9/2013 | Kanemoto et al. |
| 2013/0262501 | A1 | 10/2013 | Kuchmann-Beauger et al. |
| 2013/0282532 | A1 | 10/2013 | Shihadah et al. |
| 2013/0317808 | A1 | 11/2013 | Kruel et al. |
| 2014/0039877 | A1 | 2/2014 | Guenigault et al. |
| 2014/0067370 | A1 | 3/2014 | Brun |
| 2014/0129492 | A1 | 5/2014 | Petri et al. |
| 2014/0278363 | A1 | 9/2014 | Allen et al. |
| 2016/0050221 | A1 | 2/2016 | Myslinski |

OTHER PUBLICATIONS

Office Action for U.S. Appl. No. 14/557,637, U.S. Patent and Trademark Office, mailed Jul. 29, 2016, 30 pages.

Office Action for U.S. Appl. No. 14/567,224, U.S. Patent and Trademark Office, mailed Sep. 19, 2016, 32 pages.

Office Action for U.S. Appl. No. 14/567,258, U.S. Patent and Trademark Office, mailed Aug. 12, 2016, 35 pages.

Allen et al., "Ingesting Forum Content," U.S. Appl. No. 14/726,467, filed May 30, 2015, 53 pages.

Allen et al, "Persona-Based Conversation," U.S. Appl. 14/726,468, filed May 30, 2015, 54 pages.

Allen et al., "Inter Thread Anaphora Resolution," U.S. Appl. No. 15/054,936, filed Feb. 26, 2016, 54 pages.

"List of IBM Patents or Patent Applications Treated as Related," Letter from Leslie A. Van Leeuwen, Feb. 27, 2016, 2 pages.

Ding et al., "Resolving Object and Attribute Coreference in Opinion Mining," Proceedings of the 23rd International Conference on Computational Linguistics (Coling 2010), Aug. 2010, Beijing, China, 9 pages.

Kim et al., "Best-Answer Selection Criteria in a Social Q&A Site from the User-Oriented Relevance Perspective," Proceedings of the 70th Annual Meeting of the American Society for Information Science and Technology (Milwaukee), Aug. 30, 2008, 11 pages.

Pera et al., "A Community Question-Answering Refinement System," HT'11, The 22nd ACM Hypertext Conference, Posters and Demos, Jun. 6-9, 2011, Eindhoven, The Netherlands, 3 pages.

Gottipati et al., "Finding Thoughtful Comments from Social Media", Proceedings of Coling 2012: Technical Papers, pp. 995-1010, Mumbai, Dec. 2012.

Agichtein, Eugene et al., "Finding High-quality content in social media," Proceedings of the International Conference on Web Search and Web Data Mining, WSDM'08, Feb. 11-12, 2008, Palo Alto, California, USA, 11 pages.

Allen et al., "Ingesting Forum Content," U.S. Appl. No. 14/557,606, filed Dec. 2, 2014, 58 pages.

Allen et al., "Persona-Based Conversation," U.S. Appl. No. 14/557,618, filed Dec. 2, 2014, 62 pages.

Allen et al., "Inter Thread Anaphora Resolution," U.S. Appl. No. 14/557,637, filed Dec. 2, 2014, 60 pages.

Allen et al., "Determining the Correct Answer in a Forum Thread," U.S. Appl. No. 14/567,224, filed Dec. 11, 2014, 73 pages.

Allen et al., "Annotating Posts in a Forum Thread with Improved Data," U.S. Appl. No. 14/567,258, filed Dec. 11, 2014, 74 pages.

Office Action for U.S. Appl. No. 15/054,936, U.S. Patent and Trademark Office, mailed Nov. 8, 2016, 40 pages.

* cited by examiner

TRAINING A QUESTION/ANSWER SYSTEM USING ANSWER KEYS BASED ON FORUM CONTENT

BACKGROUND

With the increased usage of computing networks, such as the Internet, humans are currently inundated and overwhelmed with the amount of structured and unstructured information available to them from various sources. Information gaps abound as users search for information on various subjects and try to piece together what they find and what they believe to be relevant. To assist with such searches, recent research has been directed to generating knowledge management systems which may take an input, analyze it, and return results indicative of the most probable results to the input. Knowledge management systems provide automated mechanisms for searching through a knowledge base with numerous sources of content, e.g., electronic documents, and analyze them with regard to an input to determine a result and a confidence measure as to how accurate the result is in relation to the input.

One such knowledge management system is the IBM Watson™ system available from International Business Machines (IBM) Corporation of Armonk, N.Y. The IBM Watson™ system is an application of advanced natural language processing, information retrieval, knowledge representation and reasoning, and machine learning technologies to the field of open domain question answering. The IBM Watson™ Question Answering (QA) system is built on IBM's DeepQA technology used for hypothesis generation, massive evidence gathering, analysis, and scoring. DeepQA takes an input question, analyzes it, decomposes the question into constituent parts, generates one or more hypothesis based on both the decomposed question and the results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

When training a QA system an answer key is generally used which provides questions and the correct answers that needs to be verified when the system runs. Typically these are hand built based on the domain with an expert pulling this information together. Consequently, vast amounts of time and expert resources are often needed to adequately train the QA system for a particular domain.

BRIEF SUMMARY

According to one embodiment of the present disclosure, an approach is provided to train a question answering (QA) system using answer keys based on forum content. In the approach, a question is selected from a post in a threaded discussion. An answer to the selected question is automatically identified from crowd-based sources, with the identified answer having a confidence level greater than a threshold. An answer key is built using the selected question and the identified answer. The QA system is automatically trained using the answer key.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
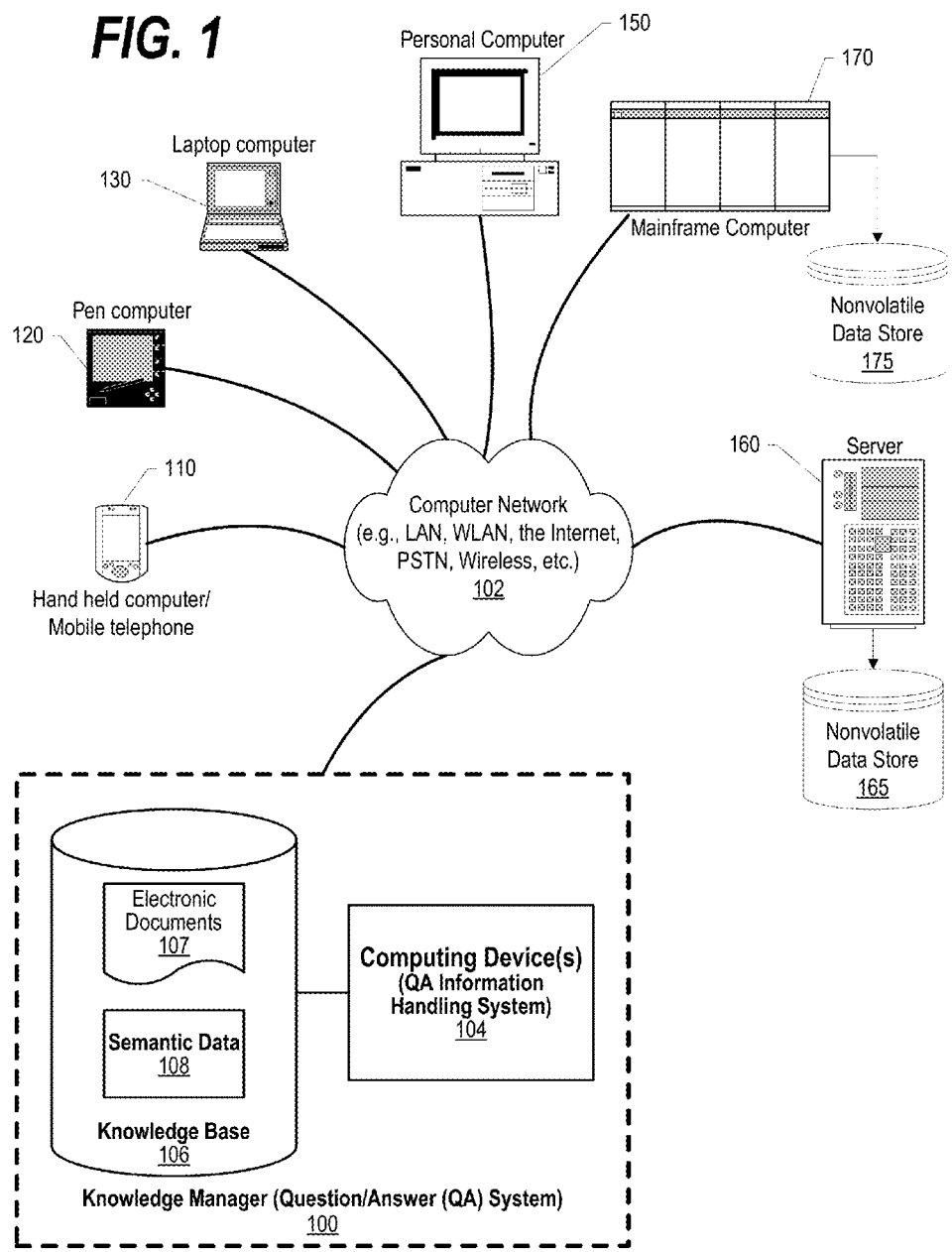
FIG. 1 depicts a schematic diagram of one illustrative embodiment of a question/answer creation (QA) system in a computer network.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 depicts a schematic diagram of one illustrative embodiment of a question/answer (QA) system 100 in a computer network 102. QA system 100 may include knowledge manager 104, which comprises one or more processors and one or more memories, and potentially any other computing device elements generally known in the art including buses, storage devices, communication interfaces, and the like. Computer network 102 may include other computing devices in communication with each other and with other devices or components via one or more wired and/or wireless data communication links, where each communication link may comprise one or more of wires, routers, switches, transmitters, receivers, or the like. QA system 100 and network 102 may enable question/answer (QA) generation functionality for one or more content users. Other embodiments may include QA system 100 interacting with components, systems, sub-systems, and/or devices other than those depicted herein.

QA system 100 may receive inputs from various sources. For example, QA system 100 may receive input from the network 102, a corpus of electronic documents 107 or other data, semantic data 108, and other possible sources of input. In one embodiment, some or all of the inputs to QA system 100 route through the network 102 and stored in knowledge base 106. The various computing devices on the network 102 may include access points for content creators and content users. Some of the computing devices may include devices for a database storing the corpus of data. The network 102 may include local network connections and remote connections in various embodiments, such that QA system 100 may operate in environments of any size, including local and global, e.g., the Internet. Additionally, QA system 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, a content creator creates content in a document 107 for use as part of a corpus of data with QA system 100. The document 107 may include any file, text, article, or source of data for use in QA system 100. Content users may access QA system 100 via a network connection or an Internet connection to the network 102, and may input questions to QA system 100, which QA system 100 answers according to the content in the corpus of data. As further described below, when a process evaluates a given section of a document for semantic content, the process can use a variety of conventions to query it from knowledge manager 104. One convention is to send a well-formed question.

Semantic data 108 is content based on the relation between signifiers, such as words, phrases, signs, and symbols, and what they stand for, their denotation, or connotation. In other words, semantic data 108 is content that interprets an expression, such as by using Natural Language Processing (NLP). In one embodiment, the process sends well-formed questions (e.g., natural language questions, etc.) to QA system 100 and QA system 100 may interpret the question and provide a response that includes one or more answers to the question. In some embodiments, QA system 100 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
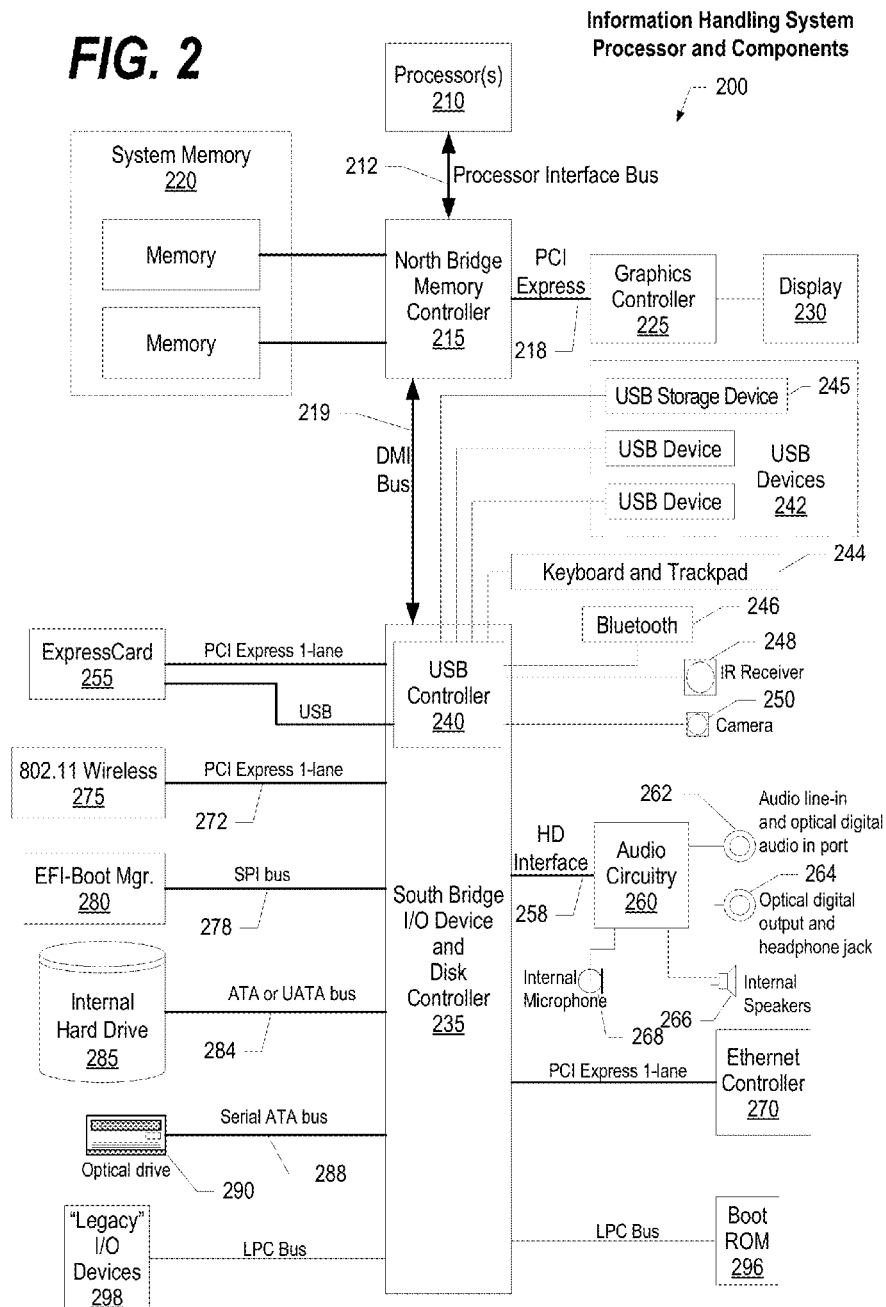
FIG. 2 illustrates an information handling system, more particularly, a processor and common components, which is a simplified example of a computer system capable of performing the computing operations described herein.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE 0.802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIGS. 3-15 depict an approach that trains a question answering (QA) system using answer keys based on forum content. In the approach, a question is selected from a post in a threaded discussion. An answer to the selected question is automatically identified from crowd-based sources, with the identified answer having a confidence level greater than a threshold. An answer key is built using the selected question and the identified answer. The QA system is automatically trained using the answer key.

Figure 3:
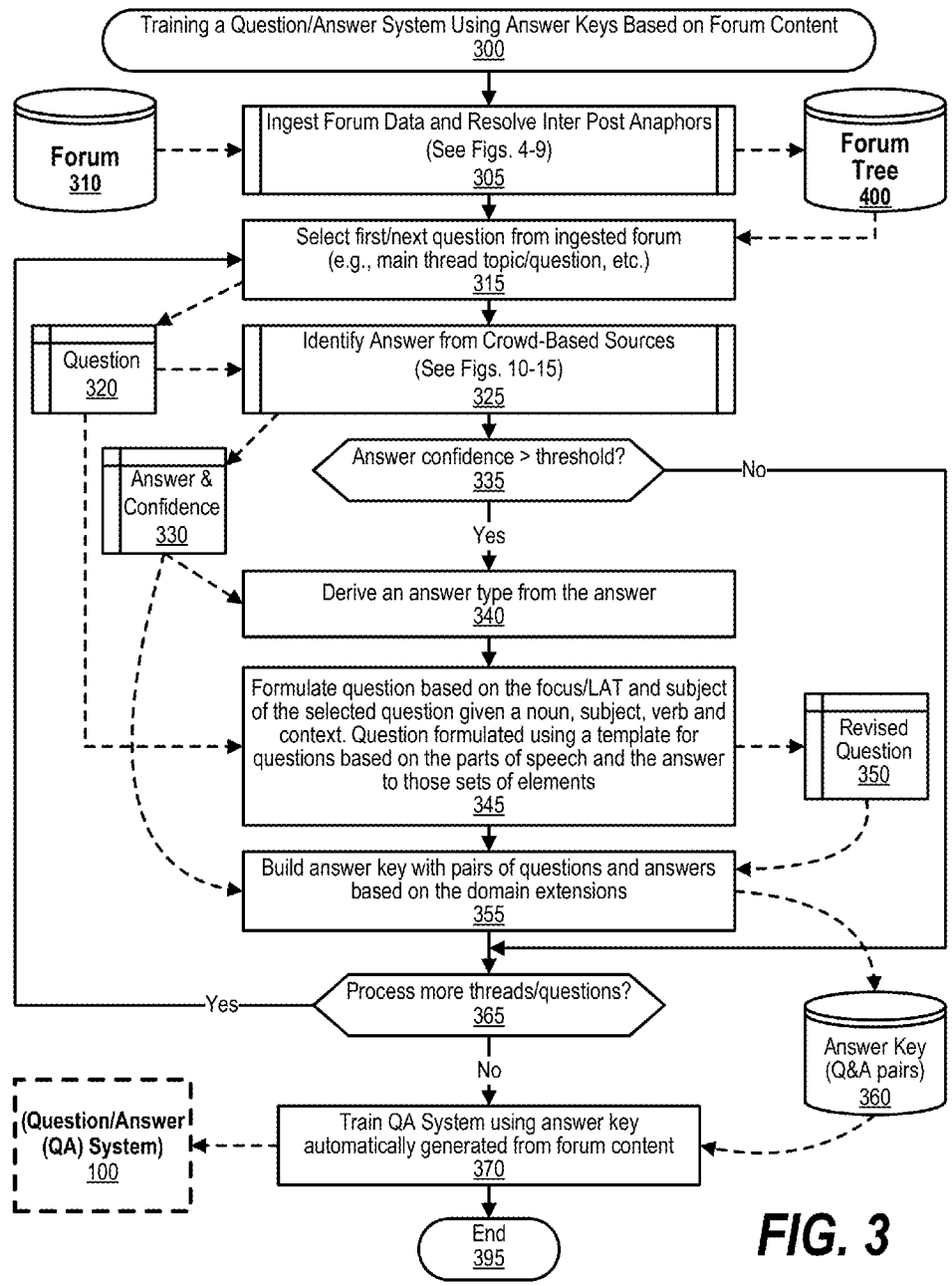
FIG. 3 is an exemplary flowchart depicting steps used to train a question answering (QA) system using answer keys that are based on online forum content.

FIG. 3 processing commences at 300 and shows the steps taken by a process that performs a routine that trains a question answering (QA) system using answer keys that are based on forum content. At predefined process 305, the process performs the Ingest Forum Data and Resolve Inter Post Anaphors routine (see FIGS. 4-9 and corresponding text for processing details). Predefined process 305 ingests forum data from data stores 310 and stores the forum data as a forum tree with forum post text and resolved anaphora data in data store 400.

At step 315, the process selects the first question from the ingested forum stored in data store 400 (e.g., main thread topic/question, etc.). At predefined process 325, the process performs the Identify Answer from Crowd-Based Sources routine (see FIGS. 10-15 and corresponding text for processing details). Predefined process 325 inputs the question from memory area 320 and results with an answer and a confidence value that are stored in memory area 330.

The process determines as to whether the confidence of the answer resulting from predefined process 325 exceeds a threshold indicating that high enough confidence exists in the answer being correct to use the answer in an answer key (decision 335). If the confidence of the answer exceeds the threshold, then decision 335 branches to the 'yes' branch to perform steps 340 through 355. On the other hand, if the confidence of the answer fails to exceed the threshold, then decision 335 branches to the 'no' branch bypassing steps 340 through 355.

At step 340, the process derives an answer type from the answer stored in memory area 330. At step 345, the process formulates a question based on the focus/LAT and subject of the selected question given a noun, subject, verb and context. The question is formulated using a template for questions based on the parts of speech and the answer to those sets of elements. The revised, formulated question is stored in memory area 350. At step 355, the process builds an answer key with pairs of questions and answers based on the domain extensions. The question and answer pairs are stored in answer key data store 360.

The process determines as to whether more threads and questions are being processed to create more answer key pairs (decision 365). If more threads and questions are being processed to create more answer key pairs, then decision 365 branches to the 'yes' branch which loops back to select the next question and identify the answer for the next question answer pair as described above. This looping continues until sufficient answer key pairs are created, at which point decision 365 branches to the 'no' branch for further processing. At step 370, the process trains QA system 100 using the answer key pairs that were automatically generated from forum content and stored in data store 360. FIG. 3 processing thereafter ends at 395.

The following is an example of anaphor resolution between posts. First, a main thread is posted to an online forum with a title of "Product outage next Friday from noon to midnight" with post text as "Hi everyone—the area I work in uses the product a lot—any chance the upgrade outage can be pushed until the weekend?" A child post is received that says "Hi John—our infrastructure support is M-F, so pushing stuff to the weekends is not usually possible. Especially in this case with technicians installing memory, they only work during the week. Keep in mind, you can still develop, just not deliver changes to each other." Here, the word "stuff" is an anaphor that refers to the term "upgrade" in the main post. Another post is received saying "Still down . . . any updates on the timeline?" Here, the words "still down" are an anaphor referring to the term "product outage" in the main post and the word "timeline" is an anaphor referring to the date and time ("Friday from noon to midnight") as the original timeline when the outage was scheduled. As used herein, a "term" in one post, such as a parent post, is any term, phrase, passage, or expression that provides a referential term to which an anaphor in a child post refers.

Figure 4:
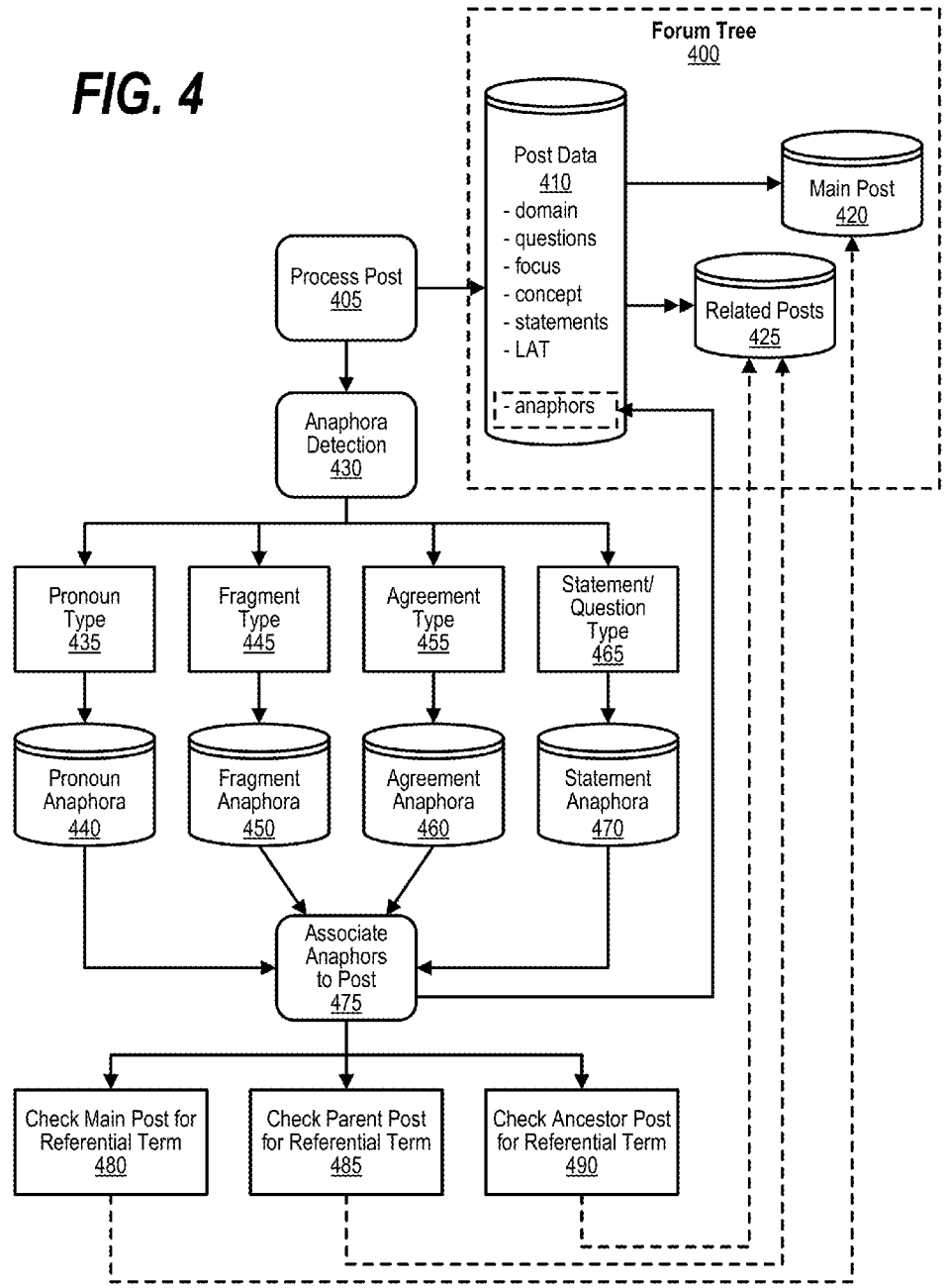
FIG. 4 is an exemplary diagram depicting various processes and data stores used to perform inter-thread anaphora resolution.

FIG. 4 is an exemplary diagram depicting various processes and data stores used to perform inter-thread anaphora resolution. Forum tree 400 is a collection of data pertaining to an online forum that is being analyzed. Post data 410 shows data elements, or attributes, that are gathered or deduced from the various posts including the domain of the post, questions posed by the post, the focus of the post, any concepts included in the post, statements made in the post and the Lexical Answer Type (LAT) of the post. In addition, anaphors that are found and resolved for the post are also stored for the post.

In forum tree 400, post data includes a main post 420 and relationships between posts, signified as related posts 425. Relationships include parent child relationships where one post (a child post) is posted after and references another post (the parent post). Main post 420 serves as a parent post to one or more other (child) posts in the forum tree.

Anaphora detection process 430 detects anaphors in identified child posts and uses referential data found in parent posts to resolve such anaphors. Anaphora detection can be broken down into different types of anaphora detection. These different types of anaphora detection include pronoun type 435 where a pronoun found in a child post refers to a noun found in a parent post. For example, the pronoun "he" found in a child post might refer to a person that was referenced in a parent post. Pronoun anaphors are stored in data store 440.

Another type of anaphora detection is fragment type 445 where a subject fragment that is found in a child post refers to a subject found in a parent post. Using the example introduced above for a software product outage, a fragment (anaphor) found in a child post of "still down" was detected and found to refer back to the product outage term that was referenced in the main post. Fragment anaphors are stored in data store 450.

Another type of anaphora detection is agreement type 455 where a statement of agreement that is found in a child post refers to an opinion or answer that was found in a parent post. For example, in a forum discussing a movie, a main post could opine that a particular movie was "fantastic." A child post could have a statement of agreement, such as "me too," or "+1," or "correct you are!" with such agreements referring back to the opinion that the movie was fantastic. Disagreements are also detected as agreement type anaphors where, instead of agreeing, the child post includes a statement of disagreement, such as "no way," "I don't think so," or "are you crazy?" with such agreements referring back to the opinion that the movie was fantastic. Agreement type anaphors are stored in data store 460.

Another type of anaphora detection is statement/question type 455 where a statement that is found in a child post refers to a question that was found in a parent post. For example, in a forum discussing the movie, a main post could pose a question of "who is the main actor in the movie?" A child post could provide an answer, such as "John Doe is the leading man in the film" with such answer referring back to the question posed in the parent post. Statement/question type anaphors are stored in data store 470.

Process 475 associates the anaphors found in the child posts to their respective terms found in their parent posts. The resolved anaphor (e.g., the pronoun "he" resolved to a particular person's name, etc.) is stored in the post's data in data store 410. To associate anaphors to parent posts, the parent posts with the relevant terms that is referenced by the anaphor found in the child post needs to be detected. This detection is performed by checking for referential terms in different types of posts. At 480, the main post in the thread or forum is checked for referential terms. At 485, the parent post of the child post is checked for referential terms. The referential terms might not be in the main or parent post, but might be in an intervening "ancestor" post between the main post and the parent post. At 490, these ancestor posts are checked for referential terms. When referential terms are found in a parent post (either the main post, the immediate parent post, or an ancestor post), the relationship is noted in forum tree 400.

Figure 5:
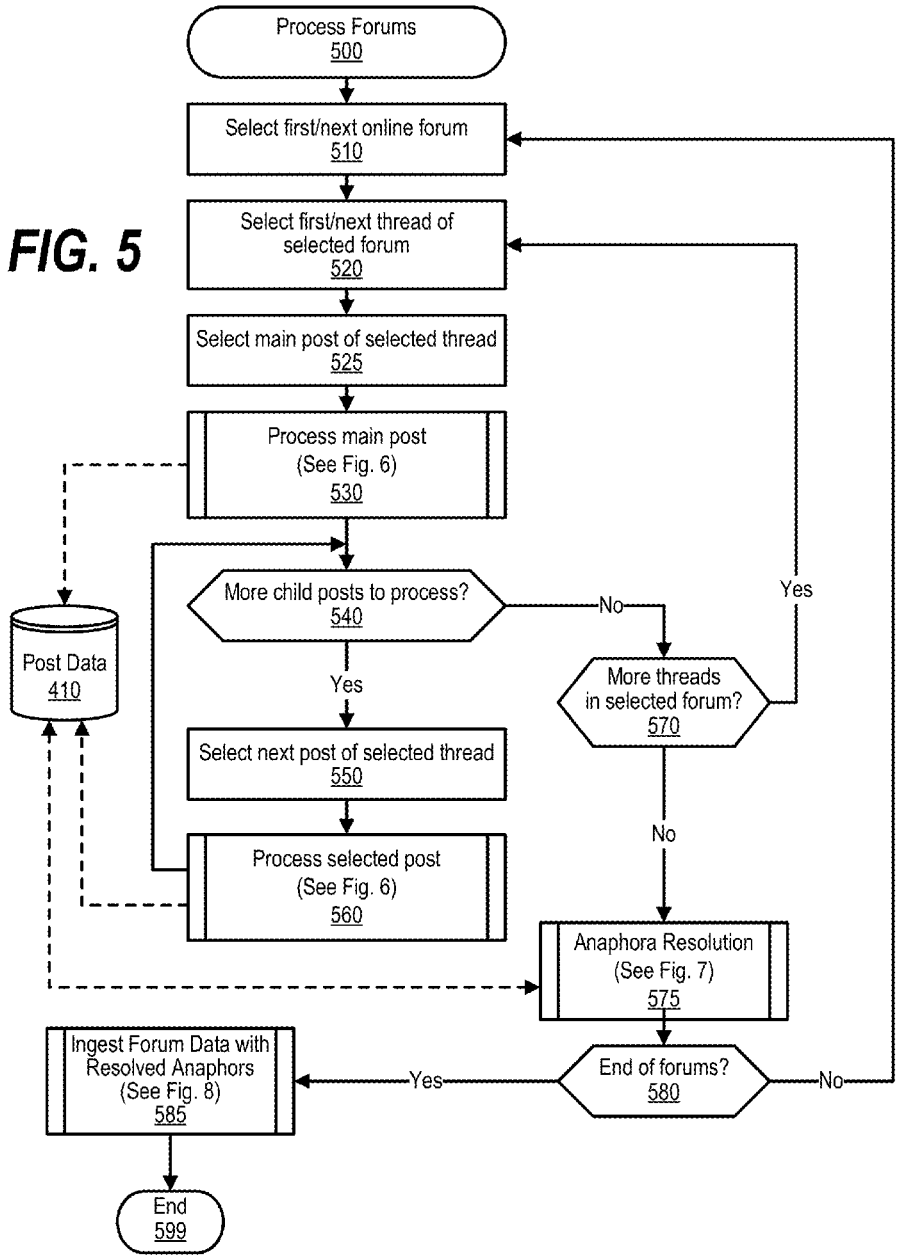
FIG. 5 is an exemplary high level flowchart that performs steps to process a forum for ingestion to a question answering (QA) system.

FIG. 5 is an exemplary high level flowchart that performs steps to process a forum for ingestion to a question answering (QA) system. FIG. 5 processing commences at 500 and shows the steps taken by a process that performs a routine that processes online forums. At step 510, the process selects the first online forum that is being processed. At step 520, the process selects the first thread from the selected forum. At step 525, the process selects the main post of selected thread.

Figure 6:
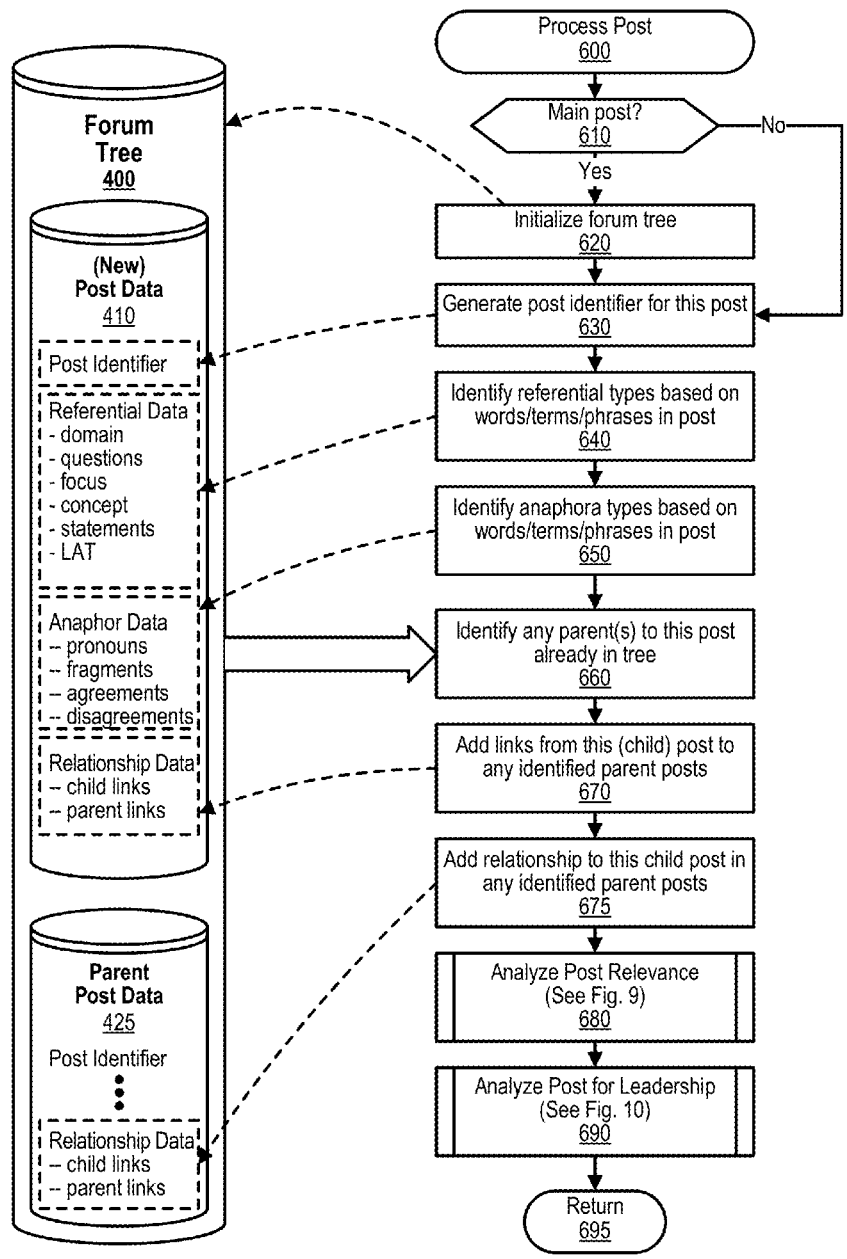
FIG. 6 is an exemplary flowchart that processes a selected post from a forum.

At predefined process 530, the main post is processed (see FIG. 6 and corresponding text for processing details). The data gathered from processing the main post is stored as post data in data store 410. The process determines as to whether there are child posts to process in the selected thread (decision 540). If there are more child posts to process, then decision 540 branches to the 'yes' branch to process additional child posts. At step 550, the process selects the next post from selected thread. At predefined process 560, the process performs the process selected post routine (see FIG. 6 and corresponding text for processing details). The data gathered from the child post is stored as post data in data store 410. Processing then loops back to decision 540.

Once all of the child posts are processed, decision 540 branches to the 'no' branch whereupon the process determines as to whether there are more threads in the selected forum to process (decision 570). If there are more threads in the selected forum to process, then decision 570 branches to the 'yes' branch which loops back to step 520 to select the next thread from the selected forum. This looping continues until there are no more threads in the selected forum to process, at which point decision 570 branches to the 'no' branch for anaphora resolution.

Figure 7:
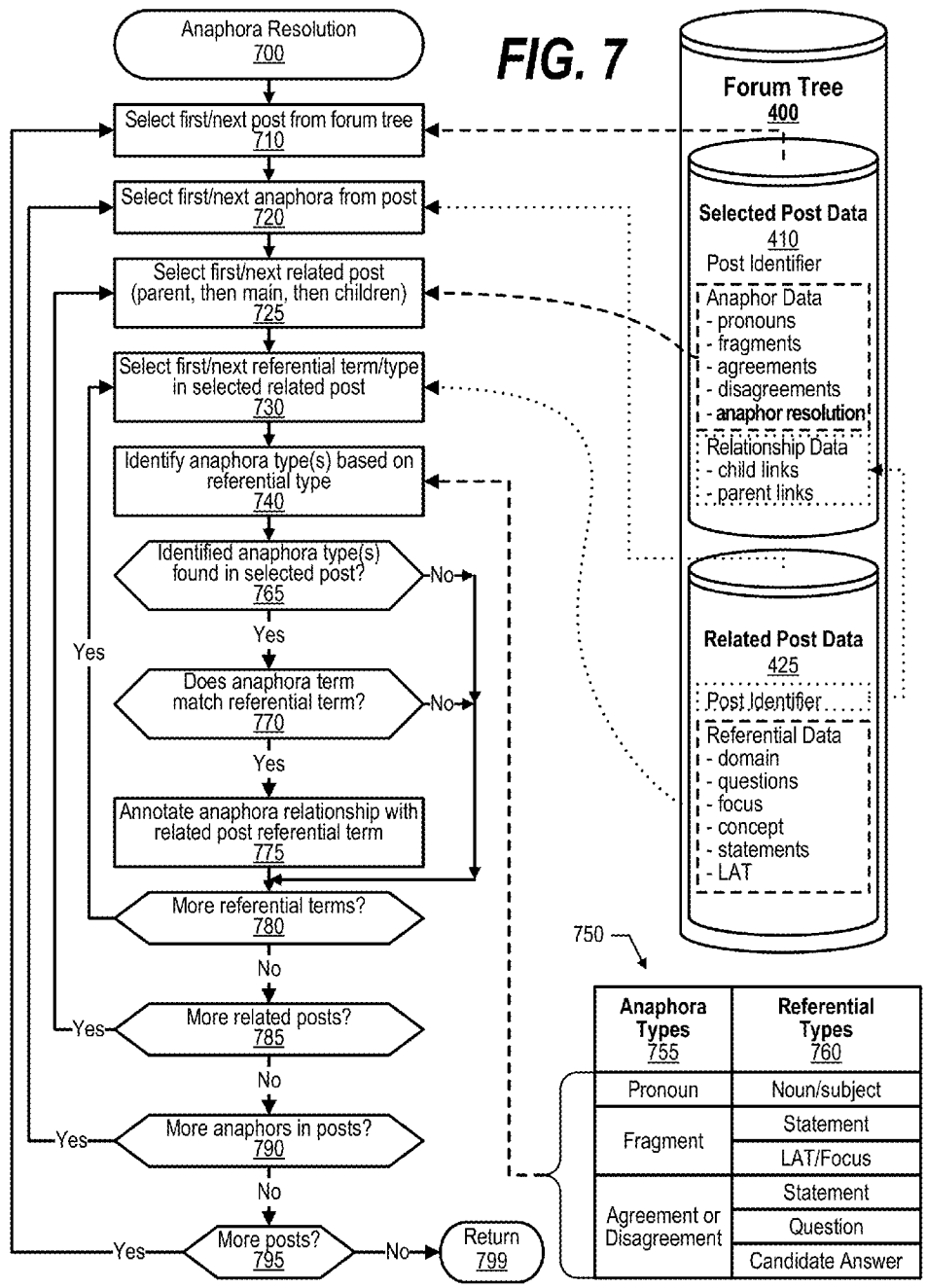
FIG. 7 is an exemplary flowchart depicting anaphora resolution of terms found in posts of a forum.

At predefined process 575, the process performs the anaphora resolution routine (see FIG. 7 and corresponding text for processing details). The anaphora resolution routine detects anaphors found in posts from post data store 410, resolves the anaphors with terms found in referential data from other posts stored in post data store 410, and resolves the anaphor by storing the identified terms referenced by the anaphors in the post data 410.

The process determines as to whether the end of forums being processed has been reached (decision 580). If the end of forums being processed has not yet been reached, then decision 580 branches to the 'no' branch which loops back to step 510 to select the next forum and process the posts in the forum as described above. This looping continues until the end of the forums being processed has been reached, at which point decision 580 branches to the 'yes' branch for further processing.

Figure 8:
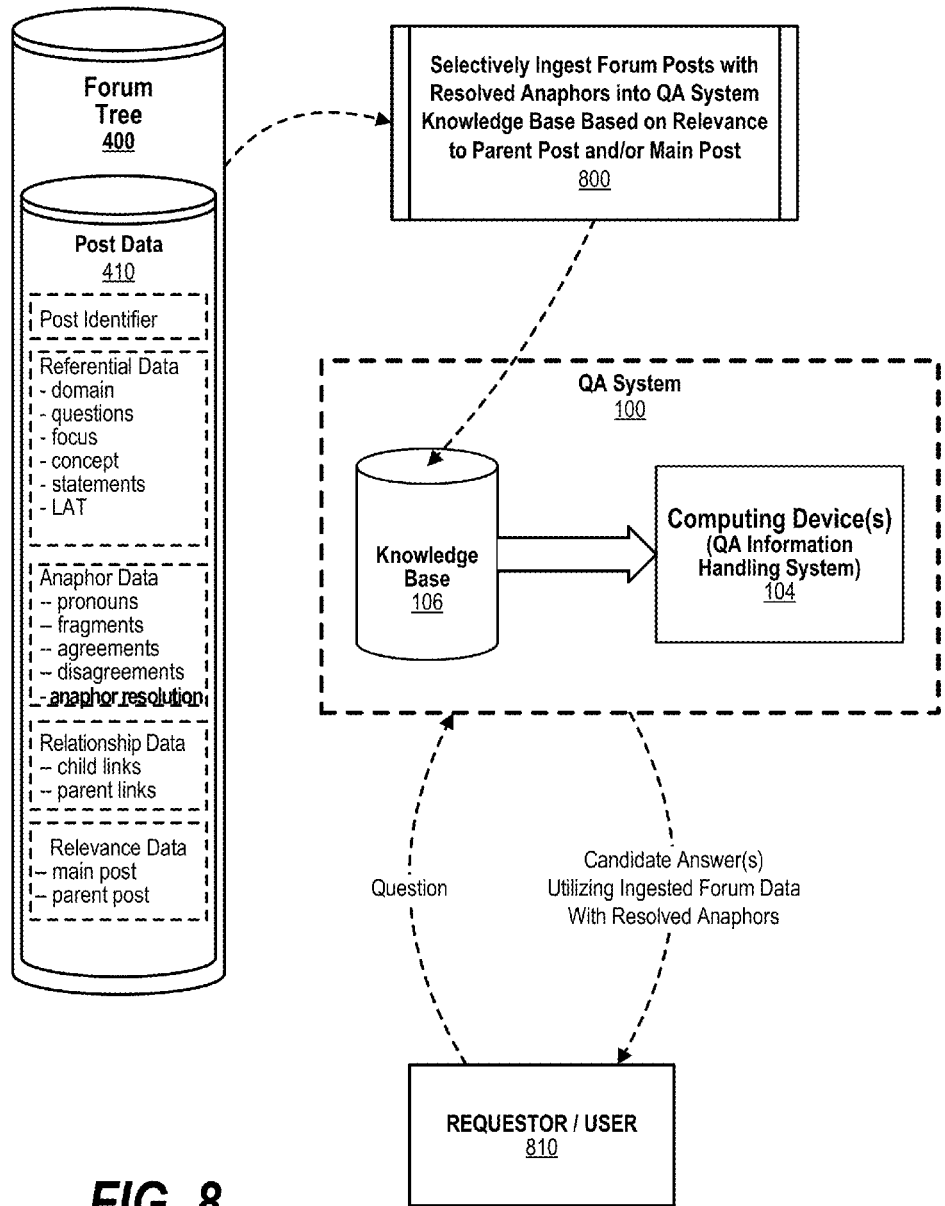
FIG. 8 is an exemplary flowchart depicting steps performed by the process that ingests forum data with resolved anaphors to a question answering (QA) system.

At predefined process 585, the process performs the Ingest Forum Data with Resolved Anaphors routine (see FIG. 8 and corresponding text for processing details). At predefined process 590, the process performs the Relevance & Sentiment routine (see FIG. 11 and corresponding text for processing details). At predefined process 595, the process performs the Build Persona-Based Conversation routine (see FIG. 12 and corresponding text for processing details). FIG. 5 processing thereafter ends at 599.

FIG. 6 is an exemplary flowchart that processes a selected post from a forum. FIG. 6 processing commences at 600 and shows the steps that perform a routine that processes data found in a post. The process determines as to whether the post being processed is the main post of the forum thread (decision 610). If the post being processed is the main post of the forum thread, then decision 610 branches to the 'yes' branch whereupon, at step 620, the process initializes forum tree 400 used to store the post data associated with this forum thread. On the other hand, if the post being processed is not the main post of the forum thread, then decision 610 branches to the 'no' branch bypassing step 620.

At step 630, the process generates a unique post identifier for this post and adds a record used to store this post data in forum tree 400 with new post data 410. At step 640, the process identifies referential types based on words, terms, and phrases found in the post that is being processed. Referential data can include the domain of the post, questions posed by the post, the focus of the post, any concepts included in the post, statements made in the post and the Lexical Answer Type (LAT) of the post.

At step 650, the process identifies anaphora types based on the words, terms, and phrases found in post that is being processed. Types of anaphors include pronoun type anaphors, fragment type anaphors, agreement type anaphors, and statement type anaphors.

At step 660, the process identifies any parent(s) to this post that are already included in forum tree 400. Parent posts include the main post to the thread, the direct parent post of the thread, and any intervening parent (ancestor) posts between the main post and the direct parent post. At step 670, the process adds links from this (child) post to any identified parent posts that were found in step 660. At step 675, the relationships between this post and parent posts are added to post data included in data store 410. Links are added to this post as links to the parent posts, and in the respective parent post data (425) as links to this child post with data store 425 being a subset of data store 410 and shown as a separate data store for illustrative purposes.

Figure 9:
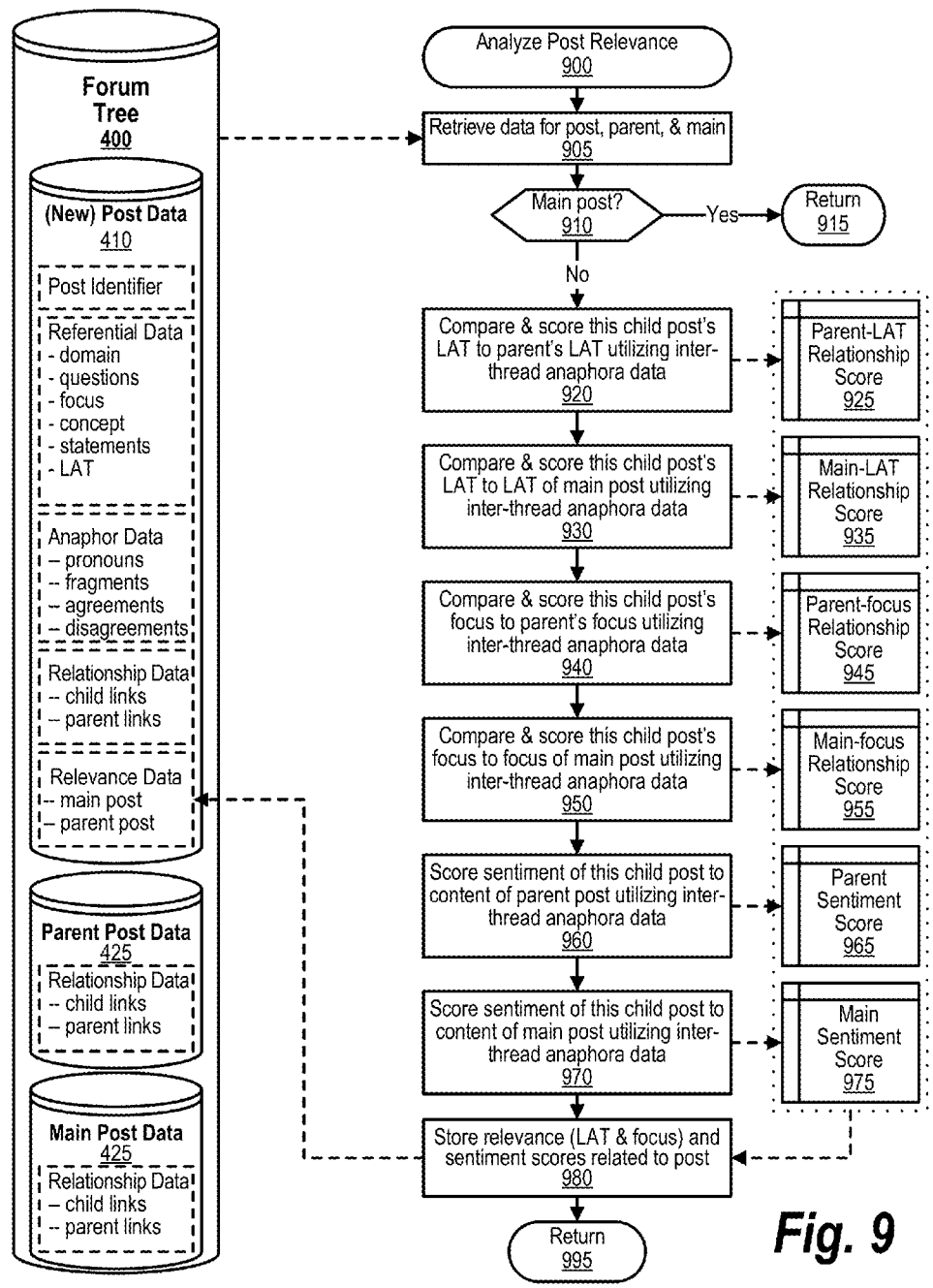
FIG. 9 is an exemplary flowchart depicting steps that analyze a post relevance.

At predefined process 680, the process performs the Analyze Post Relevance routine (see FIG. 9 and corresponding text for processing details). At predefined process 690, the process performs the Analyze Post for Leadership routine (see FIG. 10 and corresponding text for processing details). FIG. 6 processing thereafter returns to the calling routine (see FIG. 5) at 695.

FIG. 7 is an exemplary flowchart depicting anaphora resolution of terms found in posts of a forum. FIG. 7 processing commences at 700 and shows the steps taken by a process that performs a routine that resolves anaphors found in a child post. At step 710, the process selects the first post from forum tree 400. At step 720, the process selects the first anaphor from the selected post (if an anaphor exists in the post). At step 725, the process selects the first related post (immediate parent post, then main post, then ancestor posts) from forum tree 400. At step 730, the process selects the first referential term/type from the selected related post.

Table 750 depicts the relationship between anaphora types (755) and their respective referential types (760). Pronoun type anaphors are resolved with referential types found in a parent post of a noun or subject. Fragment type anaphors are resolved with referential types found in a parent post of a statement, a Lexical Answer Type (LAT), or focus. Agreement type anaphors are resolved with referential types found in a parent post of a statement or opinion, a question, or a candidate answer. At step 740, the process identifies anaphora type(s) for the selected anaphor based on the referential type as shown in table 750.

The process determines as to whether the identified anaphora type(s) were found in the selected child post (decision 765). If the identified anaphora type(s) were found in the selected child post, then decision 765 branches to the 'yes' branch for continued processing. On the other hand, if the identified anaphora type(s) were not found in the selected child post, then decision 765 branches to the 'no' branch bypassing decision 770 and step 775. The process determines as to whether the anaphora term found in the child post matches the referential term found in the parent post (decision 770). If the anaphora term found in the child post matches the referential term found in the parent post, then decision 770 branches to the 'yes' branch, whereupon, at step 775, the process annotates the anaphora relationship with related post referential term. In addition, at step 775, the anaphor found in the child post is resolved using the referential term found in the parent post. The annotated anaphora relationship data and the resolved anaphor data is stored in post data 410. On the other hand, if the anaphora term found in the child post does not match the referential term found in the parent post, then decision 770 branches to the 'no' branch bypassing step 775.

The process determines as to whether there are more referential terms that need to be processed (decision 780). If there are more referential terms that need to be processed, then decision 780 branches to the 'yes' branch which loops back to step 730 to select and process the next referential term. This looping continues until all referential terms have been processed, at which point decision 780 branches to the 'no' branch.

The process determines as to whether there are more related posts that need to be processed (decision 785). If there are more related posts that need to be processed, then decision 785 branches to the 'yes' branch which loops back to step 725 to select and process the next related post. This looping continues until all related posts have been processed, at which point decision 785 branches to the 'no' branch.

The process determines as to whether there are more anaphors included in the selected post that need to be processed (decision 790). If there are more anaphors included in the selected post that need to be processed, then decision 790 branches to the 'yes' branch whereupon processing loops back to step 720 to select and process the next anaphor from the selected post. This looping continues until all anaphors in the selected post have been processed, at which point decision 790 branches to the 'no' branch.

The process determines as to whether there are more posts in the forum tree that need to be processed (decision 795). If there are more posts in the forum tree that need to be processed, then decision 795 branches to the 'yes' branch which loops back to select and process the next post from the forum tree. This looping continues until all of the posts have been processed, at which point decision 795 branches to the 'no' branch and processing returns to the calling routine (see FIG. 5) at 799.

FIG. 8 is an exemplary flowchart depicting steps performed by the process that ingests forum data with resolved anaphors to a question answering (QA) system. At predefined process 850, the process performs the Structured Scoring of Posts that uses child agreement data to analyze statements made in parent posts. At predefined process 800, the process performs the Selectively Ingest Forum Posts with Resolved Anaphors into QA System Knowledge Base Based on Relevance to Parent Post and/or Main Post routine (see FIG. 14 and corresponding text for processing details). Predefined process 800 reads post data 410 from forum tree 400 and ingests the post data to knowledge base 106 that is utilized by question answering (QA) system 100. When requestor 810, such as a user of the QA system, poses a question to the QA system, the QA system may provide candidate answers that utilize the ingested forum data with such ingested data including resolved anaphors found in child post data.

FIG. 9 is an exemplary flowchart depicting steps that analyze the relevance of a post. FIG. 9 processing commences at 900 and shows the steps taken by a process that performs a routine that analyzes a post for relevance. At step 905, the process retrieves data from forum tree pertaining to a post, the post's parent(s) post(s), and the main post. The process determines as to whether the selected post is the main post (decision 910). If the selected post is the main post, then decision 910 branches to the 'yes' branch and processing returns to the calling routine (see FIG. 5) at 915. On the other hand, if the selected post is not the main post, then decision 910 branches to the 'no' branch and processing continues.

At step 920, the process compares and scores this child post's Lexical Answer Type (LAT) to its parent's LAT utilizing inter-thread anaphora data. Step 920 stores the Parent-LAT relationship score in memory area 925. At step 930, the process compares and score this child post's LAT to the LAT of the main post utilizing inter-thread anaphora data. Step 930 stores the Main-LAT relationship score in memory area 935.

At step 940, the process compares and score this child post's focus to its parent(s) focus utilizing inter-thread anaphora data. Step 940 stores the parent-focus relationship score in memory area 945. At step 950, the process compares and scores this child post's focus to the focus of the main post utilizing inter-thread anaphora data. Step 950 stores the main-focus relationship score in memory area 955.

At step 960, the process scores the sentiment of this child post to the content of parent post utilizing inter-thread anaphora data. Step 960 stores the parent sentiment score in memory area 965. At step 970, the process scores the sentiment of this child post to the content of the main post utilizing inter-thread anaphora data. Step 970 stores the main sentiment score in memory area 975. At step 980, the process stores the relevance scores (LAT & focus for the parent and main) and the sentiment scores related to post in post data 410. FIG. 9 processing thereafter returns to the calling routine (see FIG. 5) at 995.

Figure 10:
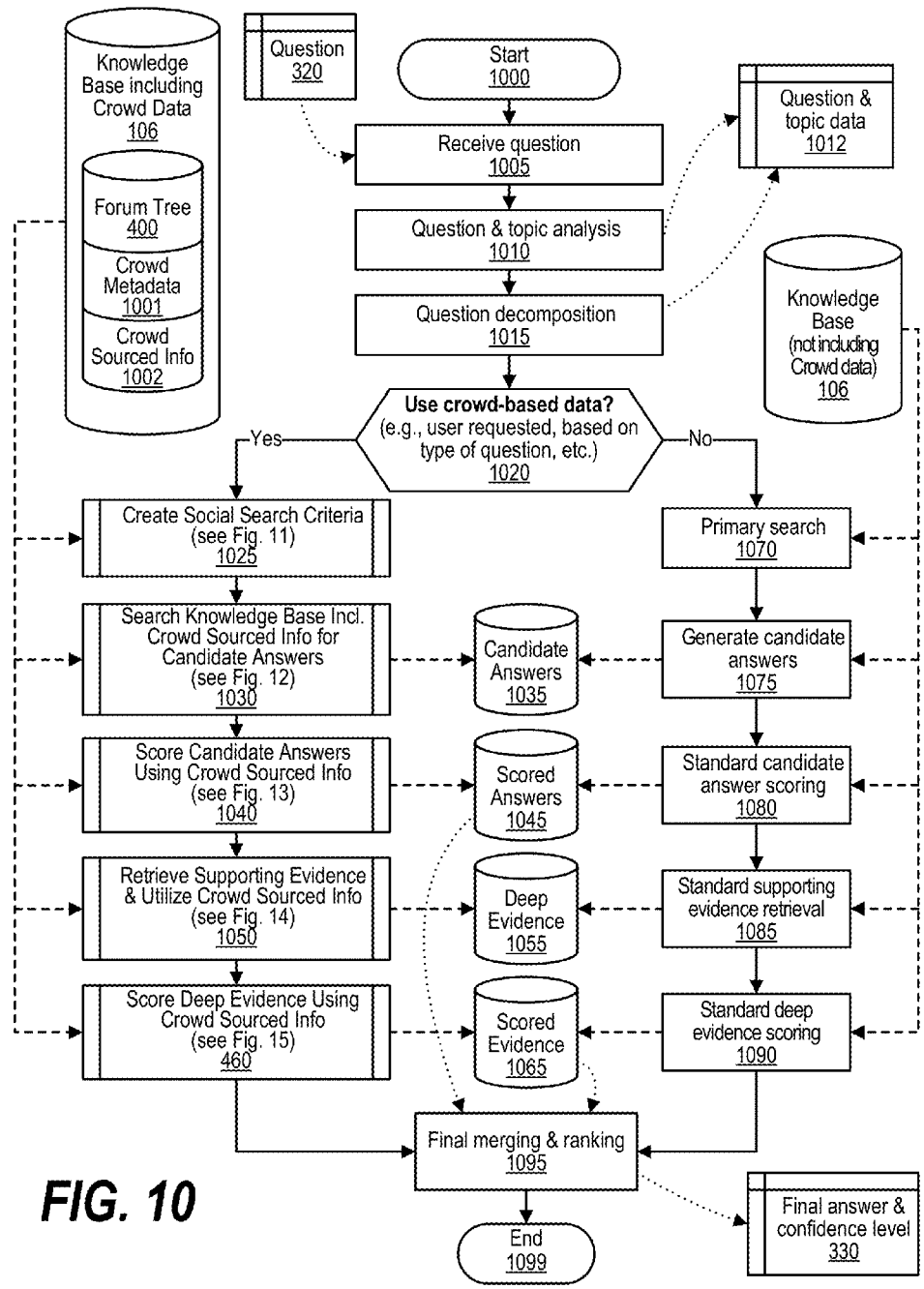
FIG. 10 is a depiction of a flowchart showing the logic used in the QA system using crowd sourced information to answer user questions.

FIG. 10 is a depiction of a flowchart showing the logic used in the QA system using crowd sourced information to answer user questions. Processing commences at 1000 whereupon, at step 1005, the process receives the question from memory area 320. At step 1010, the process performs question and topic analysis and at step 1015, the process performs question decomposition. The question-based data, such as keywords included in the question and the context of the question, are stored in memory area 1012.

A determination is made as to whether to use crowd sourced data to answer the user's question (decision 1020). This decision might be made based upon a specific user request to use crowd sourced data, based on the type of question asked by the user (e.g., a question calling for an opinion or idea from a user community, etc.), or on some other criteria. If crowd sourced data is being used to respond to the user's question, then decision 1020 branches to the "yes" branch for further processing. Steps 1025 through 1060 utilize knowledge base 106 with the inclusion of crowd sourced information 1002 and crowd metadata 1001. At predefined process 1025, the process creates a social search criteria that will be used to search the crowd sourced data (see FIG. 11 and corresponding text for further processing details). At step predefined process 1030, the process searches the QA system's knowledge base that includes crowd sourced data (crowd sourced metadata and information) in order to generate candidate answers that are stored in data store 1035 (see FIG. 12 and corresponding text for further processing details). At predefined process 1040, the process scores the candidate answers using crowd sourced data including the crowd sourced metadata (see FIG. 13 and corresponding text for further processing details). The scored candidate answers are stored in data store 1045. At predefined process 1050, the process retrieves supporting evidence for each of the candidate answers with the supporting evidence being retrieved from the knowledge base that includes crowd sourced information and metadata (see FIG. 14 and corresponding text for further processing details). The supporting evidence is stored in data store 1055. At predefined process 1060, the process scores the supporting evidence using crowd sourced metadata (see FIG. 15 and corresponding text for further processing details). The stored evidence is stored in data store 1065.

Returning to decision 1020, if crowd sourced data is not being used to respond to the user's question, then decision 1020 branches to the "yes" branch whereupon standard process is performed using steps 1075 through 1090. Steps 1075 through 1090 utilize knowledge base 106 without including crowd sourced information or metadata. At step 1070, a primary search is performed by the process using knowledge base 106. At step 1075, the process generates candidate answers from the primary search with the candidate answers being stored in data store 1035. At step 1080, the process scores the candidate answers using a standard answer scoring algorithm with the scored candidate answers being stored in data store 1045. At step 1085, the process retrieves supporting evidence pertaining to the candidate answers using a standard supporting evidence retrieval process with the supporting evidence stored in data store 1055. Finally, at step 1090, the process scores, or weights, the retrieved supporting evidence with the scored supporting evidence stored in data store 1065.

At step 1095, the process performs a final merging and ranking process using the scored candidate answers from data store 1045 and the scored (weighted) evidence from data store 1065. The final, or most likely, answer is stored in memory area 330 and is returned to the user. In one embodiment, the final, or most likely, answer is a set of candidate answers ordered by their respective probabilities of being the correct answer. In a further embodiment, the respective probabilities are returned, and displayed, to the user along with the candidate answers. The process thereafter ends at 1099.

Figure 11:
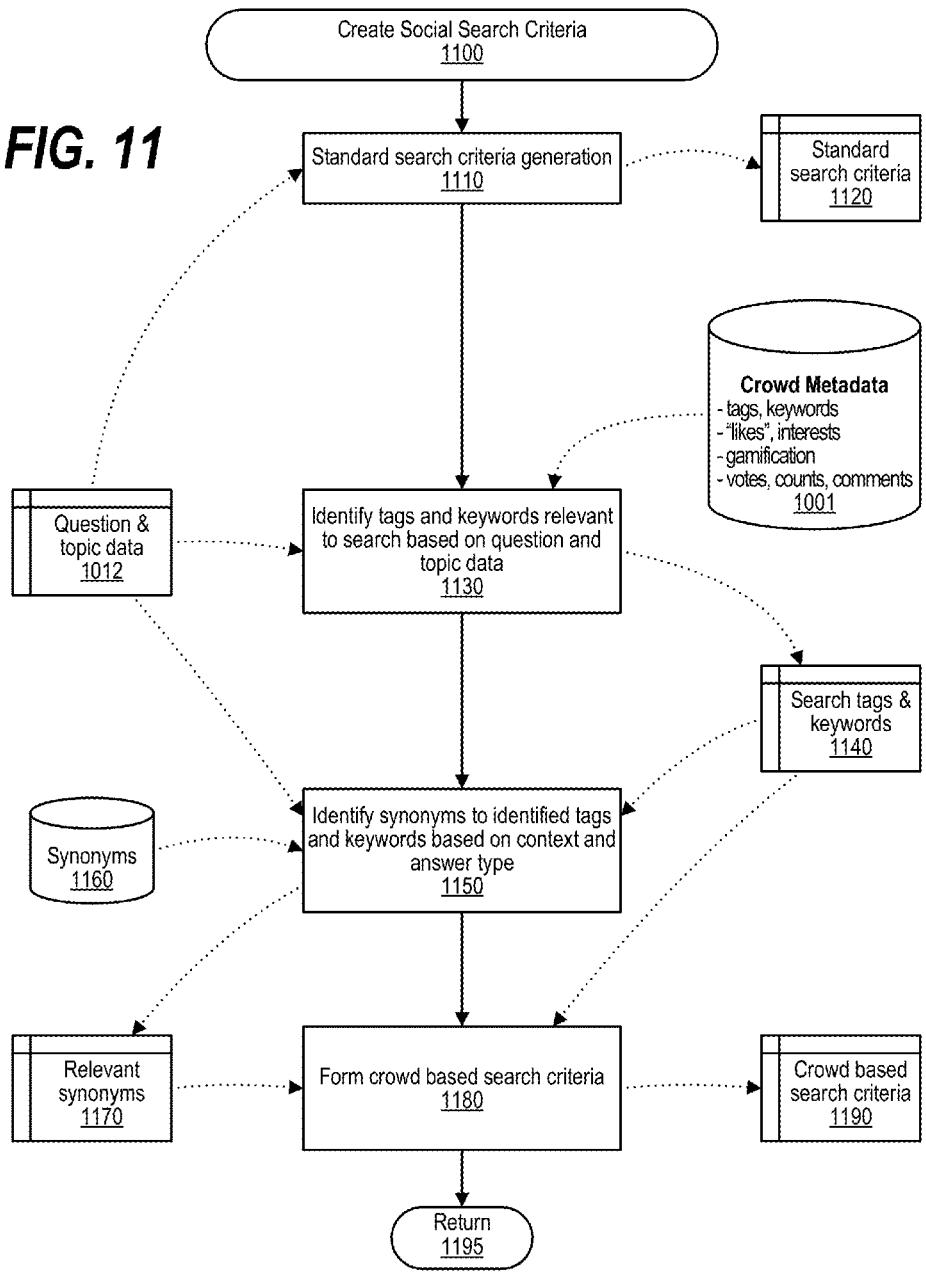
FIG. 11 is a depiction of a flowchart showing the logic performed in creating a social search criteria to answer user questions.

FIG. 11 is a depiction of a flowchart showing the logic performed in creating a social search criteria to answer user questions. Processing commences at 1100 whereupon, at step 1110, the process generates standard search criteria using the question and topic data retrieved from memory area 1012. The standard search criteria is used to search the knowledge base not including the crowd sourced information and metadata and is stored in memory area 1120.

At step 1130, the process identifies tags and keywords from the question and topic data with the identified tags and keywords being relevant to search the crowd sourced metadata. In one embodiment, the identification is made by matching keywords and context from the question and topic data with crowd sourced metadata retrieved from data store 1001. The identified tags and keywords are stored in memory area 1140.

At step 1150, the process identifies synonyms corresponding to the identified tags and keywords based on the context and answer type retrieved from memory area 1012. Available synonyms are retrieved from data store 1160 and the relevant synonyms corresponding to the identified tags and keywords are stored in memory area 1170.

At step 1180, the process generates search criteria that is based on the crowd sourced data. The generation of the search criteria is based on the search tags and keywords from memory area 1140 and the relevant synonyms from memory area 1170. The crowd-based search criteria is stored in memory area 1190. Processing thereafter returns to the calling routine (see FIG. 10) at 1195.

Figure 12:
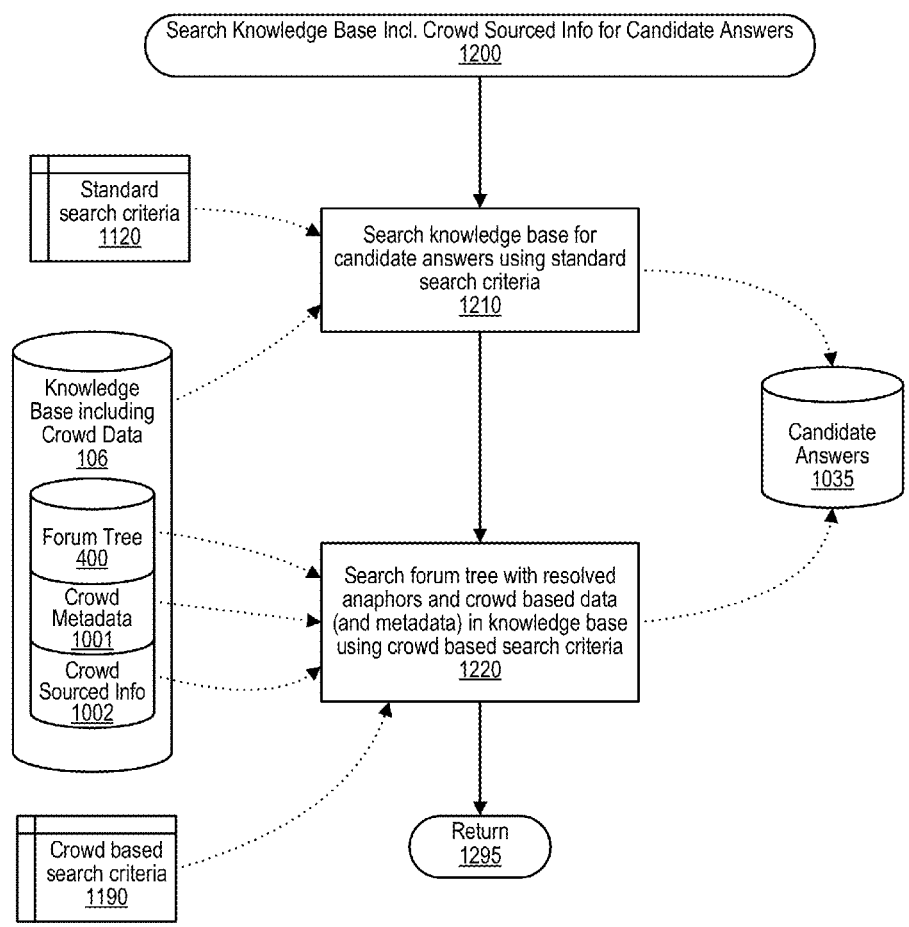
FIG. 12 is a depiction of a flowchart showing the logic used in searching the knowledge base including crowd sourced information for candidate answers.

FIG. 12 is a depiction of a flowchart showing the logic used in searching the knowledge base including crowd sourced information for candidate answers. Processing commences at 1200 whereupon, at step 1210, the process searches knowledge base 106 for candidate answers using the standard search criteria that was previously stored in memory area 1120. In one embodiment, the knowledge base searched at step 1210 does not include the crowd sourced information or metadata, while in another embodiment crowd sourced information 1002 and crowd metadata 1001 are included in knowledge base 106. The candidate answers resulting from step 1210 are stored in data store 1035.

At step 1220, the process searches the knowledge base for candidate answers using the crowd-based search criteria that was previously stored in memory area 1190. The knowledge base searched at step 1220 includes crowd sourced information 1002 and crowd sourced metadata 1001. The candidate answers resulting from step 1220 are stored in data store 1035 along with the candidate answers that were stored as result of step 1210. Processing thereafter returns to the calling routine (see FIG. 10) at 1295.

Figure 13:
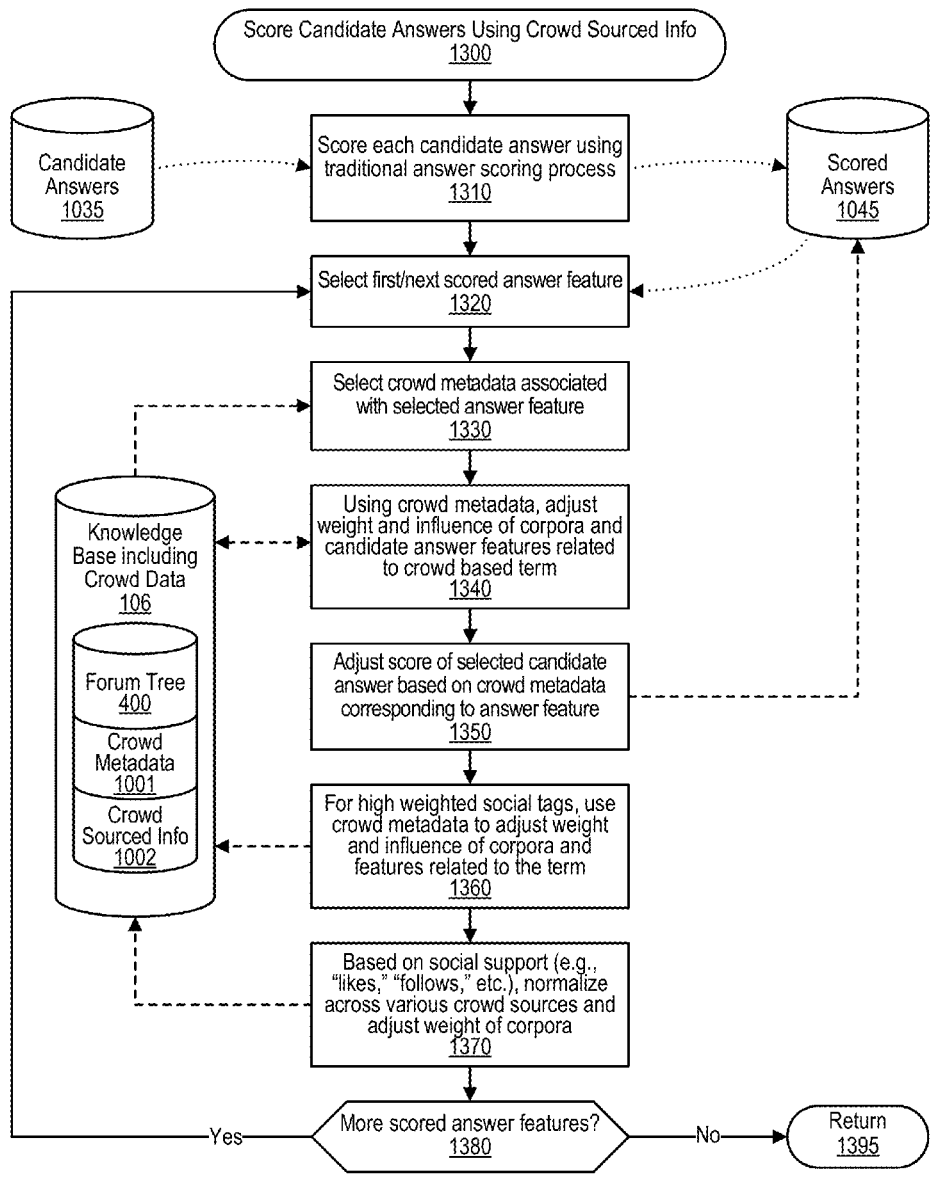
FIG. 13 is a depiction of a flowchart showing the logic performed in scoring candidate answers using crowd sourced information.

FIG. 13 is a depiction of a flowchart showing the logic performed in scoring candidate answers using crowd sourced information. Processing commences at 1300 whereupon, at step 1310, the process retrieves candidate answers from data store 1035, scores the candidate answers using traditional scoring techniques, and stores the scored candidate answers in data store 1045. In one embodiment, the traditional scoring techniques are used to score each of the candidate answers, while in another embodiment, the traditional scoring techniques are only used to score the candidate answers that were gathered from non-crowd sourced data by step 1210 shown in FIG. 12.

Returning to FIG. 13, at step 1320, the process selects the first scored answer feature from data store 1045. In one embodiment, step 1320 selects all of the answer features stored in data store 1045, while in another embodiment, step 1320 only selects those answer features that were gathered from crowd sourced data by step 1220 shown in FIG. 12. Returning again to FIG. 13, at step 1330, the process selects crowd sourced metadata associated with the selected answer feature. At step 1340, the process uses the crowd sourced metadata to adjust the weight and influence of the corpora (knowledge base 106) and candidate answer features that are related to the crowd-based term.

At step 1350, the process adjusts the score of the selected candidate answer based on the crowd sourced metadata that corresponds to the answer feature. The adjusted scored candidate answers are maintained in data store 1045. At step 1360, the process identifies highly weighted social tags and uses the crowd metadata to adjust the weight and influence of the corpora and the features related to the term with the adjustment being made to knowledge base 106.

At step 1370, the process normalizes social support for the selected answer feature across the various crowd sourced data sets corresponding to the various social media sources that provided the crowd sourced information and crowd sourced metadata. Based on the normalized social support, the process adjusts the weight of the selected answer feature in the corpora (knowledge base 106).

A determination is made as to whether there are more answer features stored in data store 1045 to process (decision 1380). If there are more answer features to process, then decision 1380 branches to the "yes" branch which loops back to select and process the next answer feature as described above. This looping continues until all of the answer features have been processed, at which point processing returns to the calling routine (see FIG. 10) at 1395.

Figure 14:
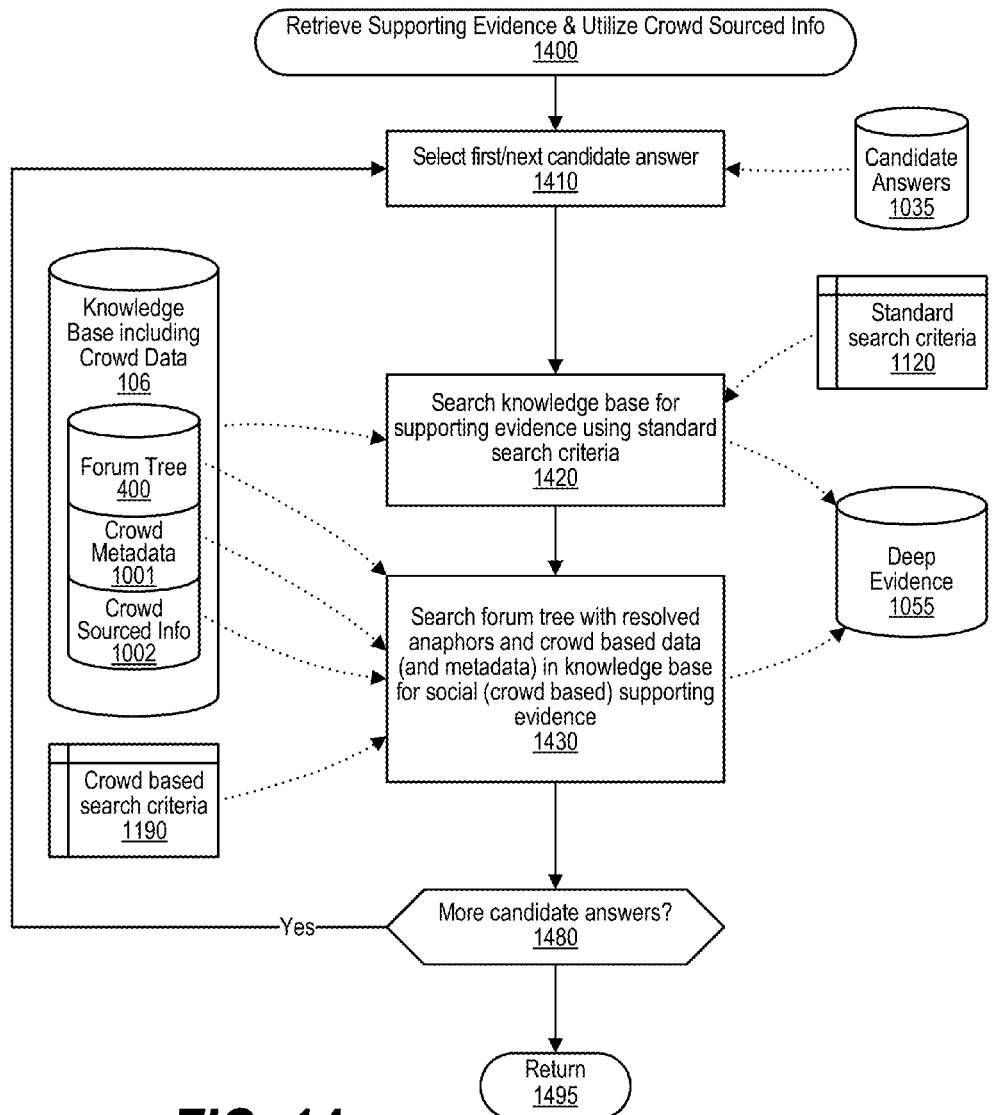
FIG. 14 is a depiction of a flowchart showing the logic performed in retrieving supporting evidence which utilizes crowd sourced information.

FIG. 14 is a depiction of a flowchart showing the logic performed in retrieving supporting evidence which utilizes crowd sourced information. Processing commences at 1400 whereupon, at step 1410, the process selects the first candidate answer from data store 1035. At step 1420, the process searches knowledge base 106 for supporting evidence related to the selected candidate answer using a standard search criteria retrieved from memory area 1120. In one embodiment, step 1420 searches the non-crowd sourced data included in knowledge base 106. The supporting evidence found by step 1420 is stored in data store 1055. In one embodiment, step 1420 is performed on all candidate answers, while in another embodiment, step 1420 is only performed on those candidate answers that were generated using non-crowd sourced data.

At step 1430, the process searches knowledge base 106 for supporting evidence related to the selected candidate answer using a crowd-based search criteria retrieved from memory area 1190. In one embodiment, step 1430 searches the crowd sourced data (crowd sourced metadata 1001 and crowd sourced information 1002) included in knowledge base 106. The supporting evidence found by step 1430 is stored in data store 1055 along with the supporting evidence stored by step 1420. In one embodiment, step 1430 is performed on all candidate answers, while in another embodiment, step 1420 is only performed on those candidate answers that were generated using crowd sourced data.

A determination is made as to whether there are more candidate answers stored in data store 1035 to process (decision 1480). If there are more candidate answers to process, then decision 1480 branches to the "yes" branch which loops back to select and process the next candidate answer as described above. This looping continues until all of the candidate answers have been processed, at which point processing returns to the calling routine (see FIG. 10) at 1495.

Figure 15:
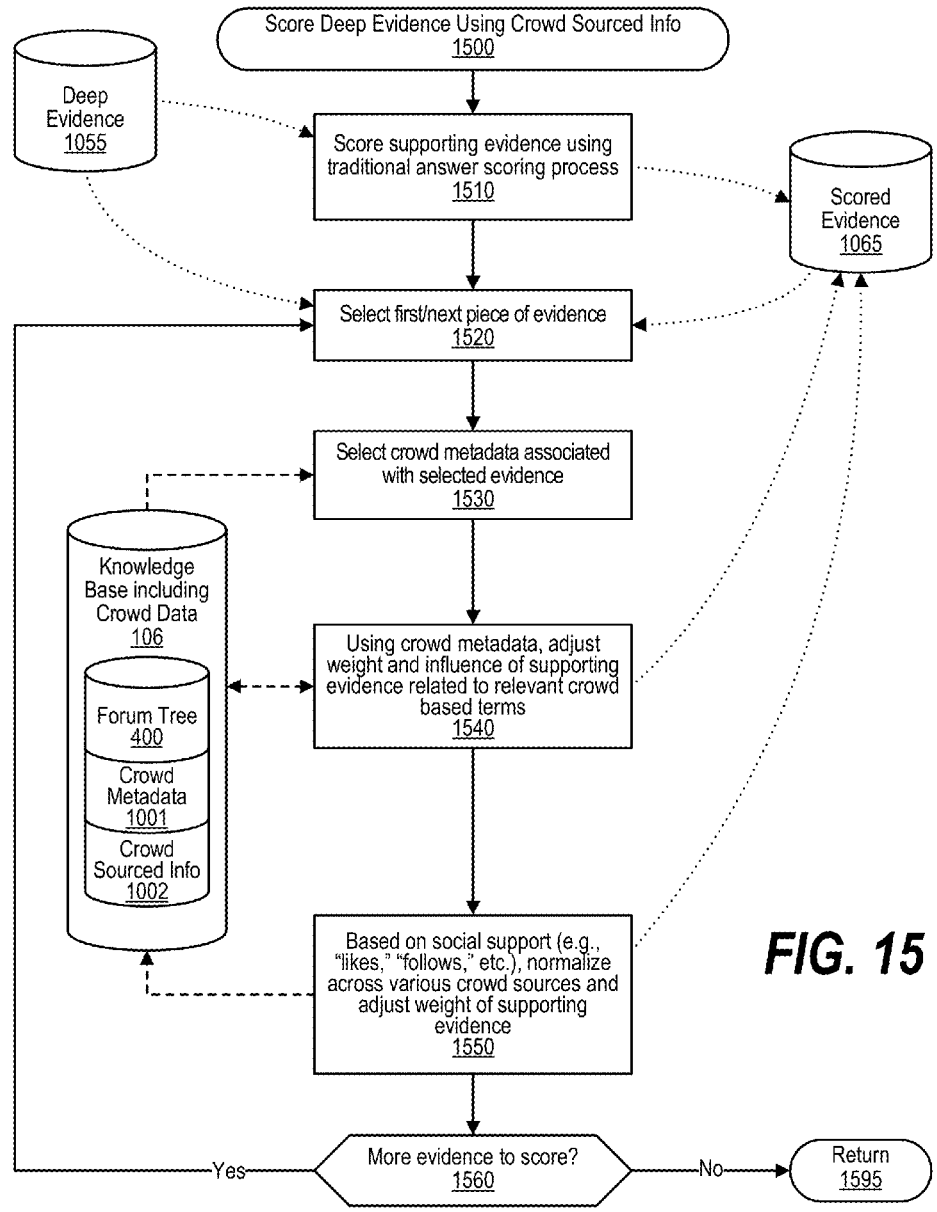
FIG. 15 is a depiction of a flowchart showing the logic performed in scoring the evidence using crowd sourced information.

FIG. 15 is a depiction of a flowchart showing the logic performed in scoring the evidence using crowd sourced information. Processing commences at 1500 whereupon, at step 1510, the process scores (weights) supporting evidence using traditional answer scoring process. The supporting evidence is retrieved from data store 1055 and the weighted supporting evidence is stored in data store 1065. In one embodiment, step 1510 is used to provide weighting to all of the supporting evidence, while in another embodiment, step 1510 is only used to provide weighted to the supporting evidence that was retrieved from non-crowd sourced data included in knowledge base 106.

At step 1520, the process selects the first piece of supporting evidence from either data store 1055 or data store 1065. In one embodiment, step 1520 selects each piece of supporting evidence, while in another embodiment, step 1520 only selects those pieces of supporting evidence that were retrieved from crowd sourced data (crowd sourced metadata 1001 and crowd sourced information 1002) included in knowledge base 106.

At step 1530, the process selects the crowd sourced metadata from data store 1001 that is associated with the selected piece of supporting evidence. At step 1540, using the crowd sourced metadata, the process adjusts the weight and influence of the supporting evidence that is associated with the relevant crowd based terms. The adjustments to the supporting evidence are made to the scored evidence stored in data store 1065 as well as to supporting evidence included in the crowd sourced data included in knowledge base 106.

At step 1550, the process normalizes social support for the selected piece of supporting evidence across the various crowd sourced data sets corresponding to the various social media sources that provided the crowd sourced information and crowd sourced metadata. Based on the normalized social support, the process adjusts the weight of the selected piece of supporting evidence in the corpora (knowledge base 106) and in the scored supporting evidence stored in data store 1065.

A determination is made as to whether there are more pieces of supporting evidence to process (decision 1560). If there are more pieces of supporting evidence to process, then decision 1560 branches to the "yes" branch which loops back to select and process the next piece of supporting evidence as described above. This looping continues until all of the pieces of supporting evidence have been processed, at which point processing returns to the calling routine (see FIG. 10) at 1595.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
    selecting a question from a post in a threaded discussion;
    automatically identifying an answer to the selected question from one or more crowd-based sources, wherein the identified answer has a confidence level greater than a threshold;

revising the selected question based on a lexical answer type (LAT) of the selected question;
building an answer key with the revised selected question and the identified answer; and
automatically training a question answering (QA) system using the answer key.

2. The method of claim 1 wherein the revising further comprises:
revising the selected question based on a focus and the lexical answer type (LAT) of the selected question given a noun, a subject, a verb and a context identified in the selected question.

3. The method of claim 1 wherein the selection of the question further comprises:
analyzing a plurality of posts included in one or more threads of the threaded discussion, wherein the analyzing further comprises:
identifying a term in a parent post of the threaded discussion;
detecting that an anaphor in a child post of the threaded discussion references the identified term; and
resolving the anaphor found in the child post with the identified term;
storing the parent post with the identified term and the child post with the resolved anaphor in a forum tree; and
selecting the parent post as the selected question.

4. The method of claim 1 wherein automatically identifying the answer further comprises:
identifying one or more question keywords and a context in the selected question using natural language processing (NLP);
mining a plurality of crowd sourced data sets for crowd sourced information, wherein the mining is based on the identified question keywords and context, and wherein the crowd sourced data sets have stored therein a collective opinion of a crowd of individuals;
evaluating the mined crowd sourced information based on a social support attribute included in a crowd sourced metadata, wherein the evaluating results in a most likely answer that is scored based on the social support attribute; and
identifying the answer as the resulting most likely answer.

5. The method of claim 4 wherein a knowledge base comprises the crowd sourced information and the crowd sourced metadata, and wherein the method further comprises:
identifying one or more of the crowd sourced metadata based on the identified question keywords and the identified question context; and
creating a social search criteria based on the identified crowd sourced metadata.

6. The method of claim 5 further comprising:
searching the crowd sourced information using the social search criteria, the result of the searching being a plurality of candidate answers.

7. The method of claim 6 further comprising:
identifying the crowd metadata associated with the plurality of candidate answers;
determining a metadata strength of the identified crowd metadata, wherein the metadata strength is based on one or more factors, and wherein at least one of the factors relates to a social support of an opinion; and
scoring the plurality of candidate answers based on an association of the identified crowd metadata to each of the candidate answers.

8. An information handling system comprising:
one or more processors;
one or more data stores accessible by at least one of the processors;
a memory coupled to at least one of the processors; and
a set of computer program instructions stored in the memory and executed by at least one of the processors in order to perform actions of:
selecting a question from a post in a threaded discussion;
automatically identifying an answer to the selected question from one or more crowd-based sources, wherein the identified answer has a confidence level greater than a threshold;
revising the selected question based on a lexical answer type (LAT) of the selected question;
building an answer key with the revised selected question and the identified answer; and
automatically training a question answering (QA) system using the answer key.

9. The information handling system of claim 8 wherein the actions further comprise:
revising the selected question based on a focus and the lexical answer type (LAT) of the selected question given a noun, a subject, a verb and a context identified in the selected question.

10. The information handling system of claim 8 wherein the selection of the question further comprises actions of:
analyzing a plurality of posts included in one or more threads of the threaded discussion, wherein the analyzing further comprises:
identifying a term in a parent post of the threaded discussion;
detecting that an anaphor in a child post of the threaded discussion references the identified term; and
resolving the anaphor found in the child post with the identified term;
storing the parent post with the identified term and the child post with the resolved anaphor in a forum tree; and
selecting the parent post as the selected question.

11. The information handling system of claim 8 wherein automatically identifying the answer further comprises actions of:
identifying one or more question keywords and a context in the selected question using natural language processing (NLP);
mining a plurality of crowd sourced data sets for crowd sourced information, wherein the mining is based on the identified question keywords and context, and wherein the crowd sourced data sets have stored therein a collective opinion of a crowd of individuals;
evaluating the mined crowd sourced information based on a social support attribute included in a crowd sourced metadata, wherein the evaluating results in a most likely answer that is scored based on the social support attribute; and
identifying the answer as the resulting most likely answer.

12. The information handling system of claim 11 wherein a knowledge base comprises the crowd sourced information and the crowd sourced metadata, and wherein the actions further comprise:
identifying one or more of the crowd sourced metadata based on the identified question keywords and the identified question context; and
creating a social search criteria based on the identified crowd sourced metadata.

13. The information handling system of claim 12 wherein the actions further comprise:

searching the crowd sourced information using the social search criteria, the result of the searching being a plurality of candidate answers.

14. The information handling system of claim 13 wherein the actions further comprise:

identifying the crowd metadata associated with the plurality of candidate answers;

determining a metadata strength of the identified crowd metadata, wherein the metadata strength is based on one or more factors, and wherein at least one of the factors relates to a social support of an opinion; and scoring the plurality of candidate answers based on an association of the identified crowd metadata to each of the candidate answers.

15. A computer program product stored in a computer readable storage medium, comprising computer program code that, when executed by an information handling system, causes the information handling system to perform actions comprising:

selecting a question from a post in a threaded discussion;

automatically identifying an answer to the selected question from one or more crowd-based sources, wherein the identified answer has a confidence level greater than a threshold;

revising the selected question based on a lexical answer type (LAT) of the selected question;

building an answer key with the revised selected question and the identified answer; and automatically training a question answering (QA) system using the answer key.

16. The computer program product of claim 15 wherein the actions further comprise:

revising the selected question based on a focus and the lexical answer type (LAT) of the selected question given a noun, a subject, a verb and a context identified in the selected question.

17. The computer program product of claim 15 wherein the selection of the question further comprises actions of:

analyzing a plurality of posts included in one or more threads of the threaded discussion, wherein the analyzing further comprises:

identifying a term in a parent post of the threaded discussion;

detecting that an anaphor in a child post of the threaded discussion references the identified term; and resolving the anaphor found in the child post with the identified term;

storing the parent post with the identified term and the child post with the resolved anaphor in a forum tree; and selecting the parent post as the selected question.

18. The computer program product of claim 15 wherein automatically identifying the answer further comprises actions of:

identifying one or more question keywords and a context in the selected question using natural language processing (NLP);

mining a plurality of crowd sourced data sets for crowd sourced information, wherein the mining is based on the identified question keywords and context, and wherein the crowd sourced data sets have stored therein a collective opinion of a crowd of individuals;

evaluating the mined crowd sourced information based on a social support attribute included in a crowd sourced metadata, wherein the evaluating results in a most likely answer that is scored based on the social support attribute; and identifying the answer as the resulting most likely answer.

19. The computer program product of claim 18 wherein a knowledge base comprises the crowd sourced information and the crowd sourced metadata, and wherein the actions further comprise:

identifying one or more of the crowd sourced metadata based on the identified question keywords and the identified question context; and creating a social search criteria based on the identified crowd sourced metadata.

20. The computer program product of claim 19 wherein the actions further comprise:

searching the crowd sourced information using the social search criteria, the result of the searching being a plurality of candidate answers;

identifying the crowd metadata associated with the plurality of candidate answers;

determining a metadata strength of the identified crowd metadata, wherein the metadata strength is based on one or more factors, and wherein at least one of the factors relates to a social support of an opinion; and scoring the plurality of candidate answers based on an association of the identified crowd metadata to each of the candidate answers.

* * * * *